Figure 3:
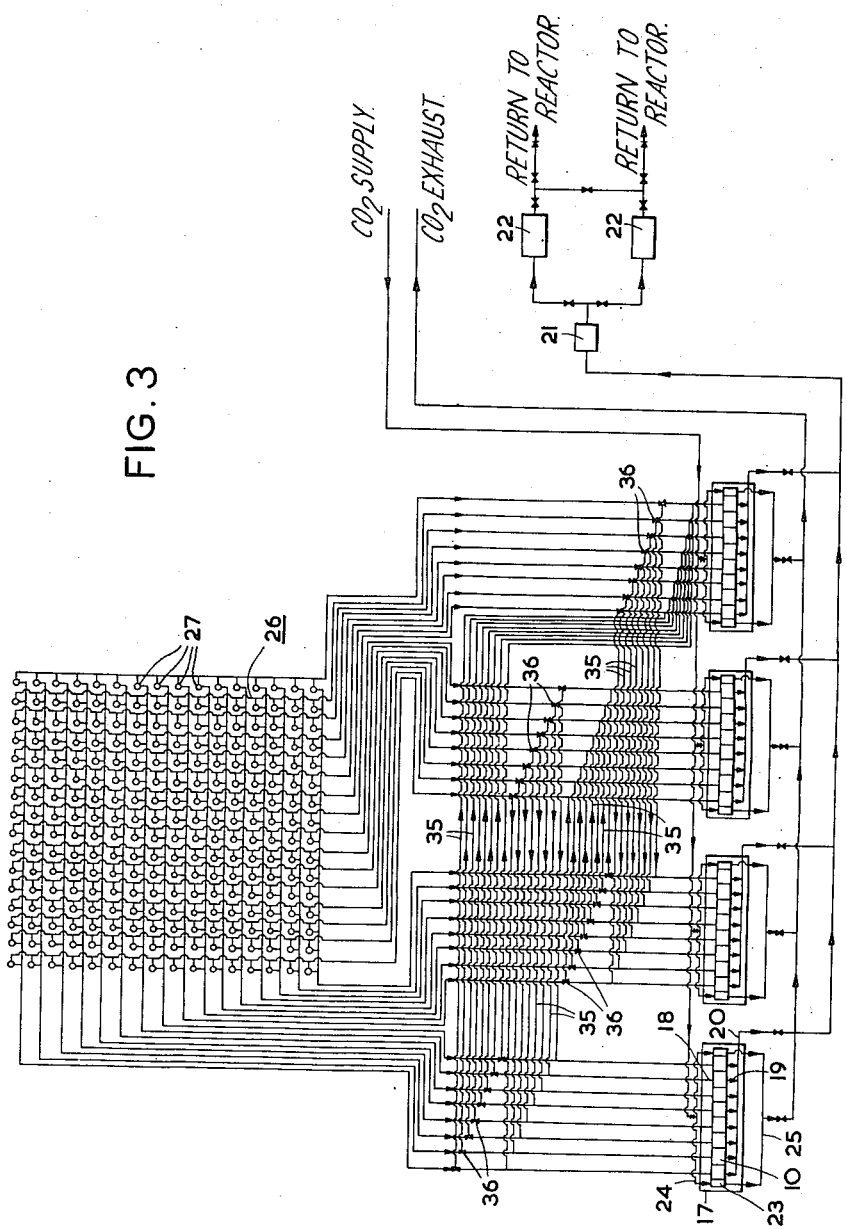

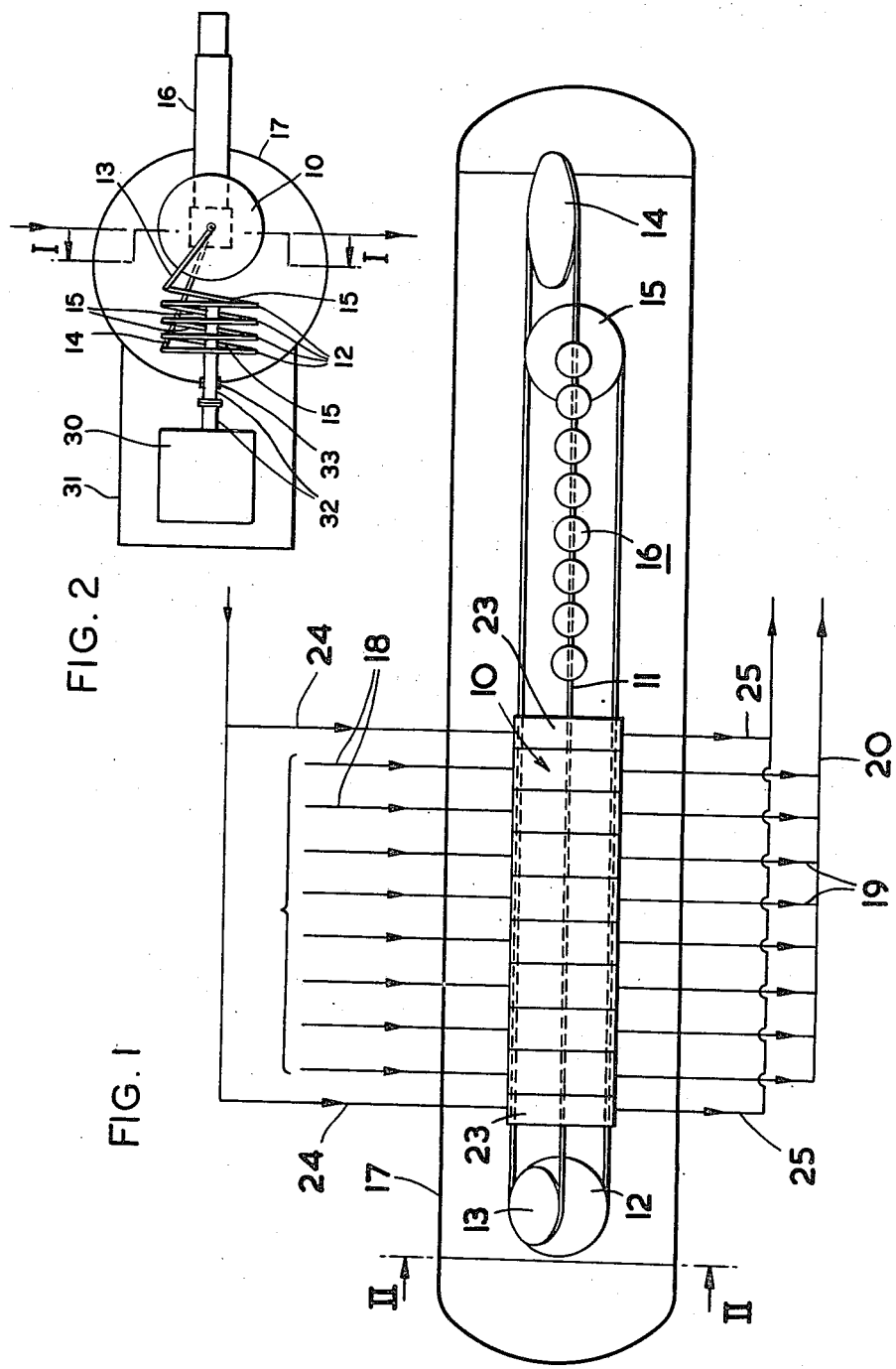

United States Patent Office 3,145,148
Patented Aug. 18, 1964

3,145,148
LEAK DETECTION APPARATUS FOR GAS COOLED REACTOR
Ronald Hugh Campbell, Bowden, England, assignor to United Kingdom Atomic Energy Authority, London, England
Filed Apr. 13, 1960, Ser. No. 21,936
Claims priority, application Great Britain Apr. 27, 1959
3 Claims. (Cl. 176—19)

This invention relates to nuclear reactors and in particular to a method of and means for testing for the presence of damaged fuel cartridges therein.

The development of a leak in a fuel cartridge forming part of a nuclear reactor core leads to the emission of fission products into coolant passing through the core to extract the heat generated by the nuclear reaction. By detecting the presence of such products the occurrence of the leak is indicated and a detector suitable for this purpose employs a charged wire disposed in a precipitation chamber to attract solid daughter products of the fission products, as set forth in French patent specification No. 1,183,812 corresponding to co-pending application Ser. No. 687,958 filed October 3, 1957, now Patent No. 3,029,344 by Everett Long et al.

Since information as to the location in the core of the damaged or leaking fuel cartridge is desirable, samples of coolant obtained from different core zones are monitored individually. Thus, in a core arrangement wherein fuel cartridges are disposed in a large number of coolant flow channels, samples to be monitored are obtained separately from each channel or each one of a large number of groups of channels. The monitoring of such samples may be sequential in which case a pulse of fission product activity could be missed if it occurred when the channel concerned was not being monitored, or it may be performed concurrently if an ample number of detectors is made available.

It is an object of the invention to provide monitoring apparatus by which a number of coolant samples can be tested concurrently for the presence of fission products, such apparatus being economical of structure by comparison with the number of separate fission product detectors necessary for the same duty.

A further object of the invention is continuous monitoring of each channel or group of channels on a cross matrix system, the channels being interconnected in matrix rows by sampling pipes for this purpose.

For testing for the presence of a damaged fuel cartridge in a gas cooled reactor, apparatus according to the invention comprises a bank of precipitation chambers, a precipitation electrode extending through the precipitation chambers, means for moving the electrode therethrough, a bank of radiation detectors with which the electrode can be made to register after movement thereof out of register with the precipitation chambers, a pressure vessel enclosing the precipitation chambers, electrode and radiation detectors, and gas inlet and outlet ducting for each precipitation chamber, the ducting extending through the wall or walls of the pressure vessel, and the spacing of the precipitation chambers and the spacing of the radiation detectors being similar and the movement of the electrode being arranged so that a signal occurring at a radiation detector can be identified with a particular precipitation chamber.

The outlet ducting of the precipitation chambers may comprise outlet pipes from each precipitation chamber and connected to a common manifold which extends through the wall of the pressure vessel, whereby pressure differences between the precipitation chambers are minimised so that sealing of the electrode inlet to and outlet from each precipitation chamber is facilitated.

Each gas inlet to a precipitation chamber of the bank may be connected for continuous sampling to each of a group of fuel element channels, each channel being also connected for continuous sampling to another precipitation chamber, providing a cross matrix system whereby a channel containing a damaged cartridge can be identified by the fact that it gives signals on two different detectors.

The pressure vessel is preferably pressurised with "clean" coolant gas at a slightly higher pressure than that of the incoming coolant gas from the fuel element channels, whereby out-leakage of coolant gas from the precipitation chambers (which may contain fission product activity) is prevented, thereby protecting the radiation detectors from having to operate in a surrounding gaseous medium which is active.

The electrode conveniently comprises a continuous wire or tape preferably provided, by means of multiple pulleys, with a long run between the radiation detectors and its entry to the precipitation chambers, so that activity precipitated on the portion in the precipitation chambers will have largely decayed before that portion is re-presented to the precipitation chambers.

By way of example, apparatus according to the present invention and suitable for performing the said method will now be described with reference to the accompanying diagrammatic drawings wherein FIG. 1 is a side view in section on line I—I of FIG. 2. FIGURE 2 is an end view in section on line II—II of FIGURE 1, and FIGURE 3 is a plan view.

FIGURES 1 and 2 illustrate a bank of eight precipitation chambers indicated generally by the reference numeral 10. The chambers are of the type shown in French Patent No. 1,183,812. Through the chambers 10 extends a continuous wire or tape 11 which can be maintained at a high electrical potential relative to the chambers 10 and acts as an electrode on which the solid daughter products of gaseous fission products may be deposited. The electrode 11 is mounted on pulleys 13 and 14 and on multiple pulley groups 12 and 15, the pulleys 12 being driven by an electric motor 30. The pulleys 13, 14 serve to support the electrode 11 so that it extends axially through the chambers 10, whilst the pulleys 12, 15 serve for storage of the electrode outside the boundaries of the chambers 10 with the driven pulley 12 imparting movement to the electrode 11 through the precipitation chambers and then through a bank of eight radiation detectors indicated by the reference numeral 16. The radiation detectors 16 are placed adjacent the chambers 10 and spaced so that on moving the electrode 11 out of the bank of chambers 10 by a necessary amount and into the bank of radiation detectors 16 each individual radiation detector 16 registers with that portion of the electrode 11 which was previously exposed in the corresponding chamber 10. The drive motor 30 is provided within a sealed casing 31 (FIGURE 2) and a shaft 32 connecting the motor 30 with the pulleys 12 is provided with a gland seal 33 where it penetrates the vessel 17. The shaft 32 is also divided within the casing 31 to enable the motor 30 to be replaced without breaking the seal at 33.

The chambers 10, radiation detectors 16, electrode 11 and pulleys 12, 13, 14, 15 are all enclosed in a pressure tight vessel 17 provided with gas inlet ducts 18 each of which passes in sealing manner through the wall of the vessel 17 and is adapted to connect a chamber 10 continuously with an element channel or group of channels in a nuclear reactor. Gas outlets ducts 19 are also provided each of which extends in sealing manner through the wall of the vessel 17, and connects a precipitation chamber 10 to a common manifold 20 from which gas is returned to the reactor via a drier 21 and compressors 22 (FIGURE 3). The ducts 18 are each fitted with a filter (not shown) which removes particulate matter from the sampled gas before it reaches the chambers 10.

The electrode 11 enters and leaves each precipitation chamber 10 through a sealing gland. Sealing is readily effected as the common manifold 20 minimises pressure differences between the individual chambers 10. Seal chambers 23 are also provided at either end of the bank of chambers 10 and a positive pressure of inactive coolant gas is supplied to the seal chambers 23 and is also maintained within the vessel 17 by means of inlet ducts 24 and outlet ducts 25 to prevent out-leakage of active gas from the chambers 10 so that the radiation detectors operate in a surrounding gaseous medium which is inactive. The continuous wire or tape electrode 11 is provided by means of the spaced pulleys 12 and 15 with a long run between the radiation detectors and its return to the precipitation chambers 10 so that activity precipitated in the chambers 10 will have largely decayed before that portion is re-presented to the precipitation chambers. A length of about 50 feet is suitable where the length of each chamber 10 is about 3 inches and the sampling time is of the order referred to hereinafter.

In typical operation of the apparatus, the portion of wire or tape 11 in the precipitation chambers 10 is kept stationary therein for 3 to 5 minutes to allow precipitation of both short and long-lived fission product daughters, and the time taken for moving that portion to the radiation detectors 16 is 10 seconds. The succeeding portion then presented to the precipitation chambers stays therein for a further 3 to 5 minutes whilst the first portion stays in register with the radiation detectors for the same period before further movement of the wire or tape to bring the said succeeding portion in 10 seconds to the radiation detectors, and so on. As the spacing of the radiation detectors is similar to that of the precipitation chambers, identification of a signal at a given radiation detector can be made with precipitation chamber and hence with a group of fuel element channels.

The fuel element channels are grouped so that each channel is connected to two different gaseous coolant sampling pipe groups which are each connected to a different bank of precipitations chambers 10 to form a cross matrix system. In FIGURE 3 is shown a reactor core 26 having 256 fuel element channels 27 grouped in eights along both X and Y coordinates to form such a system, each channel in a group having its second feed to a different group from all other channels in that group and to a different apparatus from that group. In this way activity released in any channel can be expected to be recorded on two different radiation detectors which enable the particular channel concerned to be identified. Further to provide continuous monitoring and to ensure detection of short pulses of activity which might occur during the movements of the electrode 11 in one apparatus it is arranged that the different apparatus should operate out of phase so that only one electrode is moving at any one time. Thereby, a short pulse is always detectable on at least one apparatus in which the electrode is stationary and a pulse of activity is unlikely to escape detection.

Cross-over pipes 35 with valves 36 are provided in each group of gas sampling pipes so that in the event of a precipitation and detection unit becoming unserviceable, the group of sample pipes affected can be temporarily switched to another unit already in use until such time as a standby unit can be brought into action.

Each radiation detector may be associated with a single point recorder, or a group of radiation detectors may be associated with a multi-point recorder. The radiation detectors are preferably phosphors associated with photomultiplier tubes whose output is amplified if necessary before passing to counters and the recorders. Each phosphor is arranged to form a pressure window in the wall of the vessel 17, the photomultiplier tubes being outside the vessel 17 (see FIGURE 2) and thus being easily replaceable.

The sampling time of 3 to 5 minutes described in the above example allows detection of both short and long-lived fission products. The apparatus may also be used with a short sampling time of about one minute, for example, for the detection of short-lived fission products only. The apparatus may be arranged so that the sampling time is variable between 1 and 5 minutes. For example referring to FIGURE 3, two units may be employed so as to give a sampling time of 3–5 minutes whereas the other two units are employed for a shorter time (1½ minutes, say) in a manner which ensures that each channel is sampled at both rates.

A bank of precipitation chambers followed by a bank of radiation detectors, in accordance with the present invention, has several advantages over previous apparatus in which a single precipitation chamber is followed by a single radiation detector. These advantages include less driving mechanisms and less pressure vessels, thus saving in space and cost; the absence of a selector valve (with its possibility of cross-channel leakage), not needed because of the reduction in the number of pressure vessels required; the reduction in the quantity of "clean" gas required to seal off the precipitation chambers from external contamination; and the increased sensitivity of the apparatus because of the increased time allowable for each precipitation compared with conventional operation of known apparatus. Because of its advantages over known apparatus the present invention makes it economically practicable to employ a cross-matrix system of sampling from a reactor, thus making it possible to pin-point the position of a damaged fuel cartridge to an individual channel. As an example of the improvement which can be achieved, if the present invention were applied to the Calder reactors ten units as described with reference to the drawings would be required. This would provide continuous monitoring on all channels and is to be compared with the present system which, whilst only using eight units only provides monitoring on groups of four channels at a time, the monitoring of these groups being discontinuous and in fact, taking place for only thirty seconds in every twenty-seven minutes.

I claim:

1. Apparatus for testing for the presence of a damaged fuel cartridge in a gas-cooled reactor, said apparatus comprising a bank of precipitation chambers, a precipitation electrode extending through the precipitation chambers, means for moving the electrode therethrough, a bank of radiation detectors with which the electrode can be made to register after movement thereof out of register with the precipitation chambers, a pressure vessel enclosing in common the precipitation chambers, electrode and radiation detectors, and gas inlet and outlet ducting in respect of each precipitation chamber for flowing respectively through the chambers gas samples which have contacted different fuel cartridges, the ducting extending through the wall of the pressure vessel, and the spacing of the precipitation chambers and the spacing of the radiation detectors being similar such that when the electrode has been moved a signal occurring at a radiation detector can be identified with a particular precipitation chamber.

2. Apparatus according to claim 1 wherein the outlet ducting comprises outlet pipes extending respectively from the precipitation chambers and connected to a common manifold which extends through the wall of the pressure vessel.

3. Apparatus for testing for the presence of a damaged fuel cartridge in a gas-cooled reactor, said apparatus comprising banks of precipitation chambers, each bank having a precipitation electrode extending through the precipitation chambers in the bank and movable therethrough; banks of radiation detectors which the electrodes can be made to register after movement thereof out of register with the precipitation chambers, each bank of radiation detectors being associated with a bank of precipitation chambers and the spacing of the precipitation chambers in each bank being similar to the spacing of the radiation detectors in the bank of radiation detectors associated therewith; means for moving the electrodes through the precipitation chambers and radiation detectors so that a signal occurring at a radiation detector can be identified with a particular precipitation chamber; pressure vessels each enclosing in common at least one bank of precipitation chambers, its associated bank of radiation detectors and its electrode; gas inlet and outlet ducting for each precipitation chamber, said ducting extending through the walls of the pressure vessels; and sampling pipes interconnecting channels containing fuel cartridges in rows of a cross matrix system, the inlet ducting of the precipitation chambers being coupled respectively with said sampling pipes such that each bank of precipitation chambers is confined to matrix rows in the same direction.

References Cited in the file of this patent
UNITED STATES PATENTS

| | | |
|---|---|---|
| 2,576,616 | Livingston et al. | Nov. 27, 1951 |
| 2,852,459 | Williamson | Sept. 16, 1958 |
| 3,029,344 | Long et al. | Apr. 10, 1962 |

OTHER REFERENCES

Nucleonics, vol. 14, No. 12, December 1956, pp. S–20 and S–21.

Nuclear Power, March 1957, pp. 91 and 92.